United States Patent [19]

McBride

[11] Patent Number: 4,468,419
[45] Date of Patent: Aug. 28, 1984

[54] METHOD OF MAKING A DINNERWARE ARTICLE

[75] Inventor: James W. McBride, Seattle, Wash.
[73] Assignee: Fabrik, Inc., Seattle, Wash.
[21] Appl. No.: 126,281
[22] Filed: Mar. 3, 1980
(Under 37 CFR 1.47)
[51] Int. Cl.³ .......................... B05D 1/18; B05D 5/06
[52] U.S. Cl. .................................... 427/266; 427/286
[58] Field of Search .............. 427/265, 266, 269, 286; D7/23

[56] References Cited
U.S. PATENT DOCUMENTS
3,089,782 5/1963 Bush et al. ......................... 427/269

OTHER PUBLICATIONS
Advertisement for Blue Ridge Dinnerware, The American Home, May 1954, p. 108.

Primary Examiner—Evan K. Lawrence
Attorney, Agent, or Firm—Hughes, Barnard & Cassidy

[57] ABSTRACT

A distinctive pattern of contrasting stripes is formed on a dinnerware plate by successively dipping opposite ends of the plate in glaze solutions. Initially a thin strip of glaze solution is deposited on the plate by means of a template. Thereafter, the opposite ends of the plate are dipped into one or more glaze solutions, to form two glaze areas with an intermediate strip. After the glaze solution has dried to a moderate extent, the opposite ends of the plate are again dipped in a different glaze solution, with the two second glazed areas being spaced from one another to leave a second intermediate strip spaced from the first intermediate strip. The plate is then subjected to a firing to permanently bond the glaze material to the plate. The result is a plate having contrasting stripes, some of which are formed by a single coating of the glaze solution, and some of which are made by a combination of two different glaze solutions. The plate which results from the process has a stripe pattern having contrasting shades or colors resulting from either a single glaze material or a combination of two glaze materials.

12 Claims, 18 Drawing Figures

METHOD OF MAKING A DINNERWARE ARTICLE

BACKGROUND OF THE INVENTION

The present invention relates to dinnerware having a glazed pattern thereon, and also a process for imparting a glazed pattern to dinnerware.

In making dinnerware, such as a dinner plate, the plate structure itself is first formed from a ceramic material. Then a glaze material is applied to the surface of the plate in some manner, such as by dipping the plate in a glaze solution. Quite commonly, the glaze solution comprises water, colorants (e.g. oxides, minerals, etc.) a fluxing agent (e.g. silica), and sometimes one or more clay materials. As the solution soaks into the pores of the ceramic substrate, it carries the glaze particles of the solution into the surface area of the plate substrate. After the plate is taken from the glaze solution, it is dried for a short period of time and then is subjected to a firing, where the temperature of the firing furnace is between approximately 1900° and 2700° F. The firing time can vary from perhaps one hour to as long as three to four hours, depending upon a number of factors. This firing process causes the formation of a water impervious surface layer on the plate, with the glaze material itself being firmly bonded in the surface of the plate.

Over the years, there have been various attempts to apply the glaze material in a manner to form various decorative patterns. However, there is the problem of creating a pattern which is esthetically pleasing, and yet which lends itself to a practical manufacturing process. Accordingly, it is an object of the present invention to provide a method of making a glaze pattern on a dinnerware piece so that the pattern does have artistic appeal, and so that the method can be practiced in a commercially practical manner.

A search of the patent literature disclosed several patents related to applying a surface coating to various articles. While not all of these are considered particularly relevant to the present invention, these are cited to insure that the applicant is complying with his duty to make a full disclosure to the United States Patent and Trademark Office.

U.S. Pat. No. 2,346,579, Henderson discloses the use of two separate glazes, one of which is a water glaze, and the other of which is a water repellant glaze. This is to prevent any overlapping of the two glaze materials.

U.S. Pat. No. 1,813,551, Smith discloses a method where the edge of a plate is treated in a particular manner to produce a "feathered" or "rippled" edge pattern. After this, the entire plate is dipped and then subjected to a firing operation.

U.S. Pat. No. 1,420,306, Sigol et al. shows a method for dipping two opposite sides of a ball for obtaining contrasting color.

U.S. Pat. No. D. 239,809 shows a decorative pattern for a plate where there is a thin, small upstanding ridge extending across the main portion of the plate.

SUMMARY OF THE INVENTION

The method of the present invention is for making a decorative dinnerware article by applying a pattern on a dinnerware piece, with the piece having an upper edge and a lower edge. There is applied a first glaze material to the piece in a manner that the first glaze material reaches between the lower edge to a first glaze line positioned between the lower and upper edges to create a first glaze area. There is then applied a second glaze material to the piece in a manner that the second glaze material extends between the upper edge to a second glaze line positioned above the first glaze line to create a second glaze area and a third intermediate area between said first and second glaze areas.

Then a third glaze material is applied to extend over the second glaze area, over the third intermediate area, and over at least a portion of said first glaze area to a third glaze line positioned below said first glaze line, with the third glaze material being contrasting relative to said first and second glaze materials.

Thereafter, the piece is subjected to a finishing process to cause the first, second and third glaze materials to become bonded to the dinnerware piece. The piece thus becomes formed with a pattern of at least four sections, namely a first upper section corresponding to a combination of the second and third glaze materials, a second section corresponding to said third glaze material, a third section corresponding to a combination of the third and first glaze materials, and a fourth section corresponding to the first glaze material.

In one embodiment, the first and second glaze materials are substantially similar to one another so that the first and third section are of similar character. In the preferred form, the glaze lines are substantially parallel to one another, so that the sections are formed as substantially parallel stripes. Also, in the preferred embodiment, a thin stripe of glaze material is applied across the piece. Then the first, second and third glaze materials are applied in a manner that the first, second and third glaze lines are substantially parallel to the thin stripe.

As a further preferred embodiment, a fourth glaze material is applied to the plate between the lower edge and a fourth glaze line located below the first glaze line to form a fifth section below the fourth section. The fifth section corresponds to a combination of the first and fourth glaze materials. In one form, the third and fourth glaze materials are contrasting with one another, so that the fifth section contrasts with the first section. In yet another form, the third and fourth glaze materials are substantially similar to one another, whereby the fifth and first sections are substantially similar in character.

The dinnerware article made according to the method described above is formed with at least four sections, with adjacent sections of the four sections contrasting with one another. In one form, the first and second glaze solutions are of similar character, so that the first and third sections of the dinnerware are of similar character. Desirably, the sections meet with one another at edge lines corresponding to the glaze lines, with the edge lines being substantially parallel so that the sections are formed as substantially parallel stripes. In a preferred form, the article has a thin stripe of glaze material across the article, with the thin stripe being substantially parallel to edge lines of the sections.

In another embodiment, the dinnerware article has a fifth section located below the first section. The fifth section is formed by applying a fourth glaze material over the first glaze material, so that the fifth section has a character corresponding to a combination of the first and fourth glaze materials. In one form, the third and fourth glaze materials are contrasting with one another, so that the first and fifth sections on the article are of a contrasting character. In another form, the third and fourth glaze materials are similar to one another, and the first and second glaze materials are similar to one another, so that the first, third and fifth sections are of a similar character. Other features of the present invention will become apparent from the following detailed description.

DESCRIPTION OF THE PREFERRED EMBODIMENTS

Figure 1:
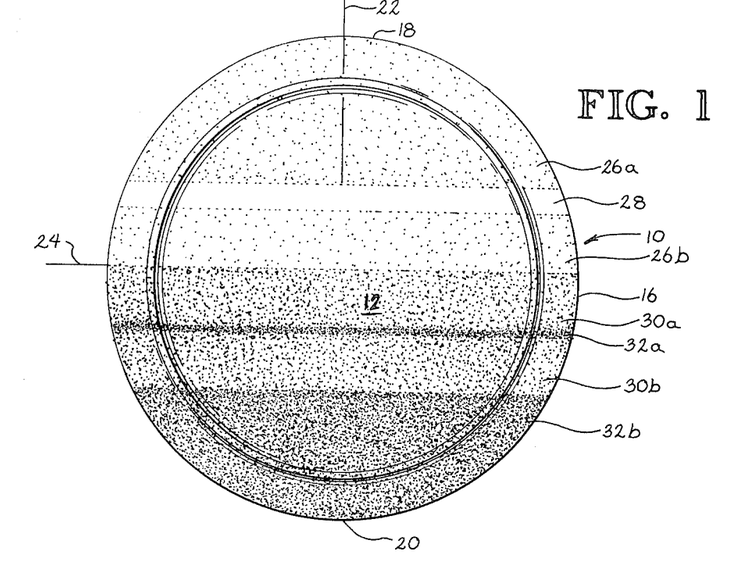
FIG. 1 is a top plan view of a plate made according to a first embodiment of the present invention.
Figure 2:
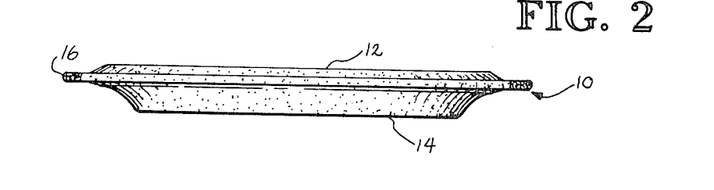
FIG. 2 is a side elevational view of the plate of FIG. 1.
Figure 3:
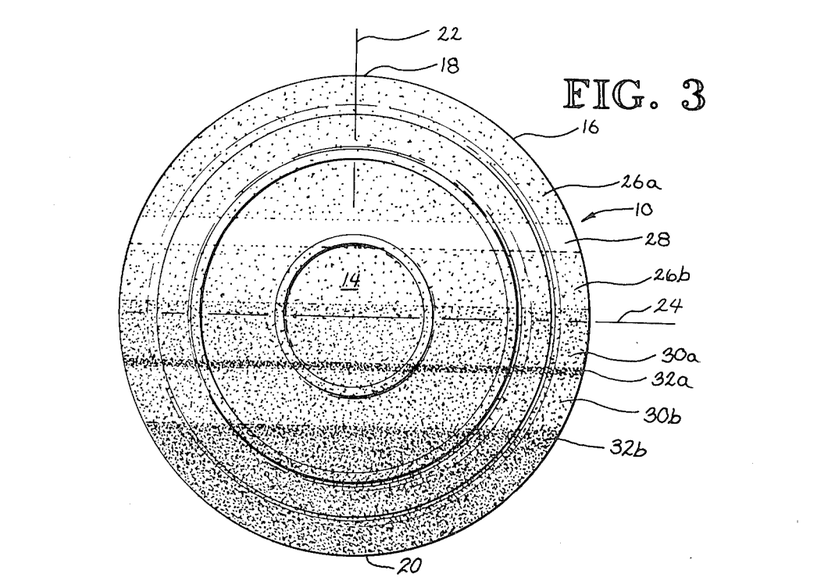
FIG. 3 is a bottom view of the plate of FIGS. 1 and 2.

Reference is made to FIGS. 1 through 3, which shows a dinnerware plate 10 made according to the process of the first embodiment of the present invention. This plate 10 has a front surface 12, a back surface 14, and a circular perimeter 16. In describing the process of the present invention, the plate will be considered as having a top edge 18, a bottom edge 20, a vertical axis 22 extending from the bottom to the top edge, and a horizontal axis 24 perpendicular to the vertical axis 22.

The shape of the plate 10 is or may be of conventional design. A distinctive feature of the present invention is the particular arrangement of the protective and decorative glaze coating on the surface portions of the plate 10. This is accomplished in such a manner that the end pattern is itself aesthetically pleasing, and the process is accomplished in a manner that the steps of applying the glaze coating can be practiced as a practical manufacturing process.

In the particular embodiment shown in FIG. 1, there are seven distinct bands or stripes extending horizontally across the front and back surfaces of the plate 10. There is a first top stripe 26a of a first shade and/or color, a second adjacent stripe 28 of a second shade and/or color contrasting with that of the stripe 26a, a third stripe 26b of the same shade and/or color as the first stripe 26a, a fourth stripe 30a of a shade and/or color contrasting with stripes one through three, a fifth relatively thin stripe 32a which is of a shade and/or color that contrasts with the stripes one through four, a sixth stripe 30b which is of the same shade and/or color as the fourth stripe 30a, and finally a seventh stripe 32b of the same shade and/or color as the fifth stripe 32a.

To describe the process of the first embodiment of the present invention, reference is now made to FIGS. 4 through 8, which show the front surface of the plate. Initially, the plate 10 is provided as a ceramic plate 34 which is or may be of a conventional ceramic material having small pores adjacent the surface portion to receive the glaze material. In this particular embodiment, three separate glaze solutions are used, each of which is contrasting with the other two, either in shade, color, or in both shade and color. Such glaze solutions are well known in the prior art, and generally comprise water, a colorant (e.g. oxides, minerals, etc.), a fluxing agent (e.g. silica), and possibly one or more clay materials. When the ceramic solution is applied to the surface of the plate 34, the solution soaks into the pores adjacent the surface and thus carries the glaze particles into the surface pores.

Figure 4:
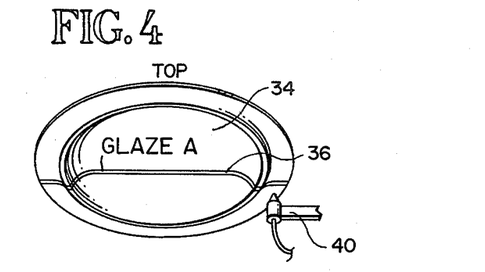
FIG. 4 is an isometric view looking at the front surface of the plate of the first step of the process of the first embodiment.

In the process of the first embodiment, as illustrated in FIG. 4, a first glaze material, glaze A, is applied as a thin horizontal band 36 to the surface of the plate 34. This can be done by placing a template (not shown) against the plate and utilizing a spray gun 40 to apply the glaze A material in the form of the thin band 36. In the final configuration of the plate 10 which is the finished product, this band 36 becomes the fifth stripe 32a. This formation of the thin band 36 has a dual function. First, it contributes to the final decorative pattern of the plate. Second, it provides a reference line by which further dipping steps can be performed to apply the other glaze materials to the plate 34.

Figure 5:
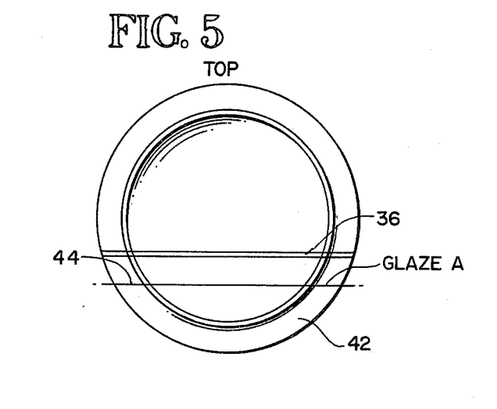
FIGS. 5 through 8 are plan views of the front surface of the plate to illustrate the process of the first embodiment showing successive steps in applying glaze solutions to the plate.

Next, with reference to FIGS. 5 through 8, the plate 34 is sequentially dipped in the glaze solutions. As shown in FIG. 5, the first dip is accomplished by immersing a bottom portion 42 of the plate 34 into the glaze A solution up to the level of a first glaze line 44. This bottom portion 42 becomes in the end configuration of the plate 10 the bottom stripe 32b, with the glaze line 44 being the line separating the sixth and seventh stripes 30b and 32b.

Figure 6:
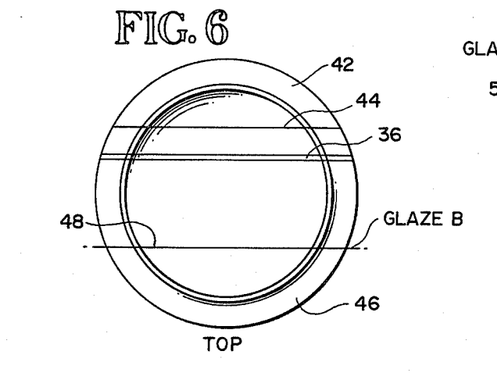

As illustrated in FIG. 6, the plate 34 is turned upside down, and a top portion 46 of the plate 34 is dipped into a glaze B solution up to a second glaze line 48. The glaze B solution contrasts with the glaze A solution in either or both shade and color. Again, the band or stripe 36 can be used as a guide to maintain the second glaze line 48 horizontal. This top portion 46 becomes in the end configuration of the plate 10 the top stripe 26a, with the second glaze line 48 separating the first and second stripes 26a and 28.

Figure 7:
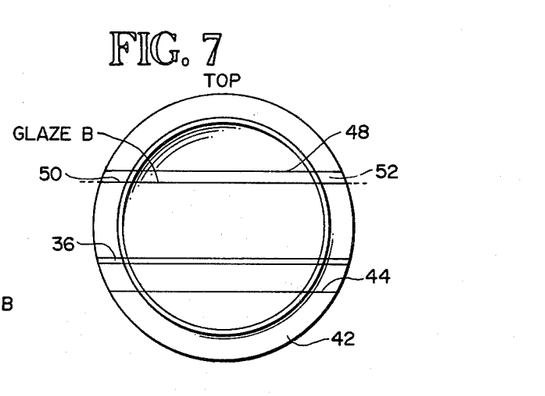

Subsequent to the step of FIG. 6, as shown in FIG. 7, the plate 36 is inverted so that the top side is now up, and the plate is dipped into the glaze B solution again up to a third glaze line 50 located above both the band 36 and the first glaze line 44, and below the second glaze line 48. The area 52 between the second glaze line 48 and the third glaze line 50 becomes in the end configuration of the plate 10 the second stripe 28.

Figures 8, 9:
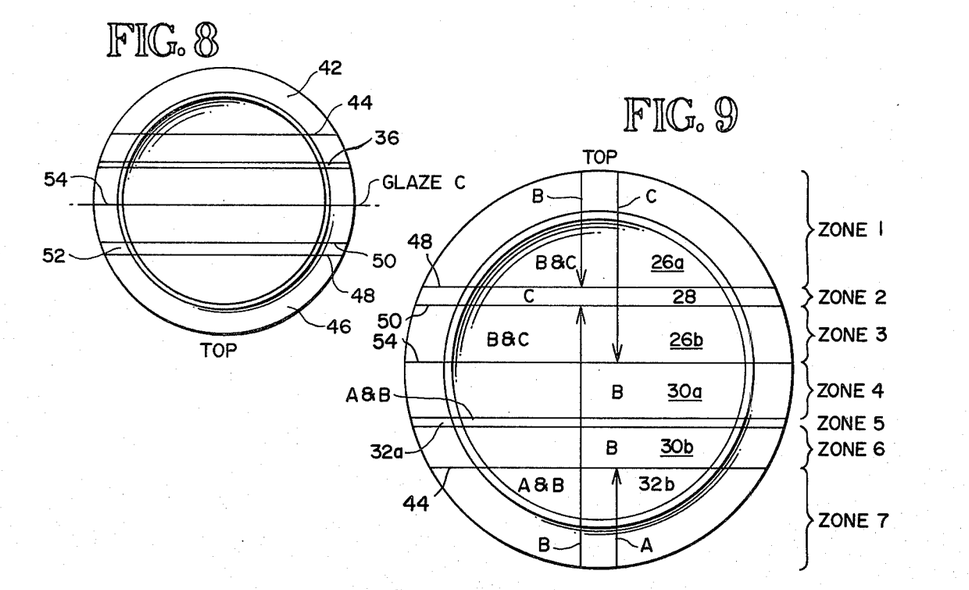
FIG. 9 is a plan view of the plate of the first embodiment of the present invention, illustrating the make-up of the various contrasting decorative stripes.

The final dipping step is illustrated in FIG. 8, where the plate 34 is inverted so that the top side is down, and the plate is dipped into a glaze C solution up to a fourth glaze line 54 which is positioned between the band 36 and the third glaze line 50. The glaze C solution is contrasting in either or both color and shade with the glaze A and glaze B solutions. The area between the fourth glaze line 54 and the band 36 becomes the fourth stripe 30a, while the area between the fourth glaze line 54 and the third glaze line 50 becomes the third stripe 26b in the configuration of the plate 10.

With regard to the timing of these various steps, the plate 36 is dipped into the glaze solution for a relatively short period of time (e.g. ½ second to three seconds). Subsequent to the dip in the glaze solution, the plate 36 is permitted to dry for about five minutes before the same area that has just been dipped is dipped into a subsequent glaze solution. This permits the first glaze solution to dry out to the extent that the subsequent glaze solution can be accepted into the pores of the surface portion of the ceramic plate 34.

Subsequent to the dipping steps illustrated in FIGS. 5 through 8, the plate 36 subjected to a finishing process to fix the glaze material in the plate surface. The usual manner of accomplishing this is subjecting the plate to a firing process which serves not only to fix the glaze material in the surface of the plate 34, but also to make the surface of the plate 34 water impervious. This can be accomplished in a conventional manner, such as heating the plate for a period of from one to four hours, at a temperature between 1900° and 2700° F. Subsequent to the firing process, the plate 34 is permitted to cool, and the result is the finished plate 10 of the present invention.

In FIG. 9, the plate 10 is shown in plan view. To appreciate the overlapping pattern of the various glaze solutions, arrows have been drawn on the plate 10 in FIG. 9 to illustrate the direction and depth of each dip, with the glaze solution of that dip being identified. Thus, it can be seen that the first and third stripes 26a and 26b, respectively, are of a shade and color which result from a combination of the glaze B and glaze C solutions. The second stripe 28 is of a color and shade corresponding to the glaze C solution alone. The fourth and sixth stripes 30a and 30b, respectively, correspond in color and shade to the glaze B solution alone. The fifth stripe or band 32a and the seventh stripe 32b have a color and shade corresponding to a combination of the glaze A and glaze B solutions.

A second embodiment of the present invention will now be described with reference to FIG. 10 through 18. Components of the second embodiment which correspond to components of the first embodiment will be given like numerical and letter designations, with a prime (') designation distinguishing those of the second embodiment.

The seond embodiment is similar to the first embodiment in that a striped pattern is made were there are seven distinct stripes or zones. However, in the second embodiment, only two contrasting glaze solutions are employed, with only three contrasting shade and/or colors being produced.

Figure 10:
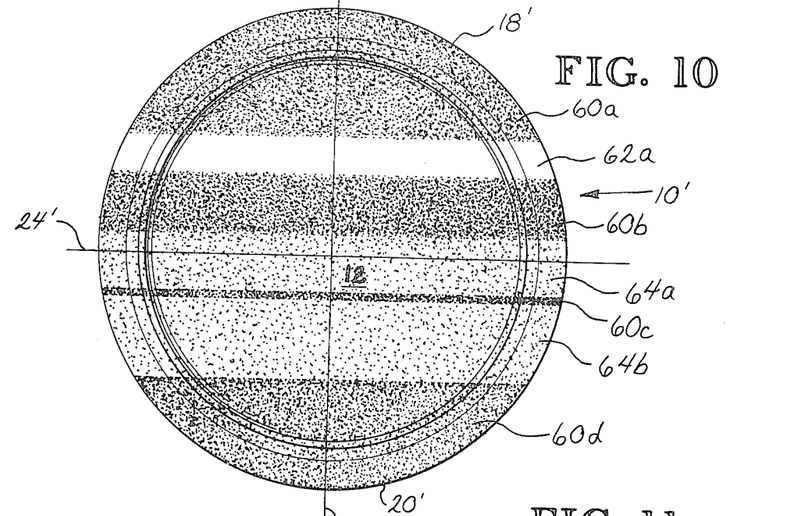
FIG. 10 is a plan view of a second embodiment of the present invention.
Figure 11:
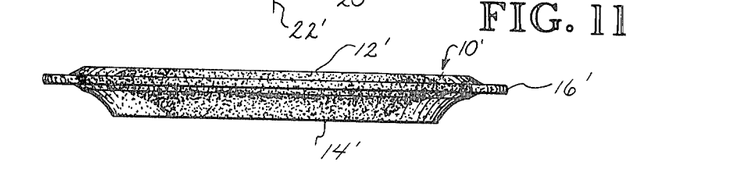
FIG. 11 is a side elevational view of the plate of FIG. 10.
Figure 12:
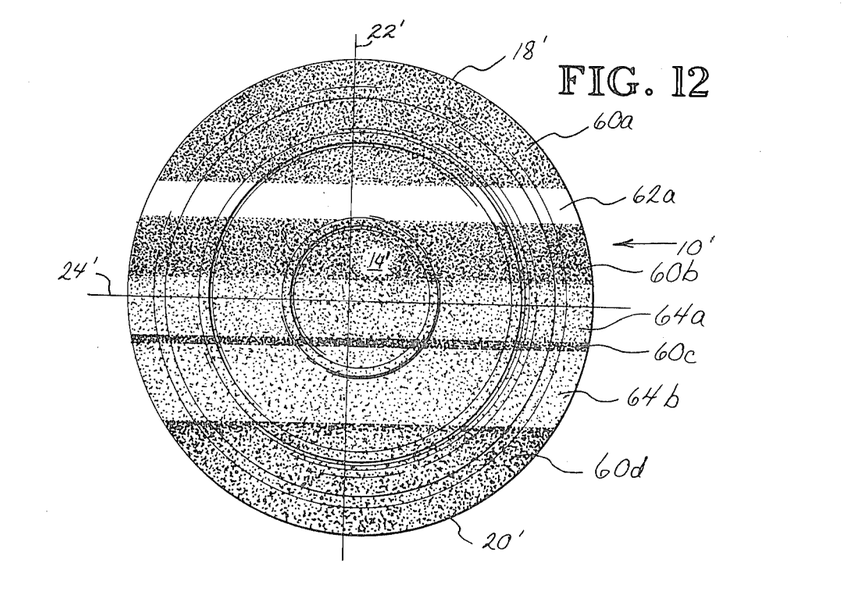
FIG. 12 is a bottom view of the plate of FIGS. 10 and 11.

As in the first embodiment, there is a plate 10' having a front surface 12', a back surface 14', a perimeter portion 16', a top edge 18', a bottom edge 20', a vertical axis 22' and a horizontal axis 24'.

In the plate made according to the second embodiment, there are, as in the first embodiment, seven distinct bands or stripes extending horizontally across the front and back surfaces of the plate 10'. There is a first top stripe 60a of a first shade and/or color, a second adjacent stripe 62a of a second shade and/or color contrasting with that of the stripe 60a, a third stripe 60b of the same shade and/or color as the first stripe 60a, a fourth stripe 64a of a shade and/or color contrastng with stripes one through three, a fifth relatively thin stripe 60c having the same shade and/or color as stripes one and three, a sixth stripe 64b having the same shade and/or color as the fourth stripe 64a, and finally a seventh lowermost stripe 60d having the same shade and/or color as the first, third and fifth stripes 60a, 60b, and 60c.

To describe the process of the second embodiment, reference is now made to FIGS. 13 through 17. Initially, the plate 10' is provided as a ceramic plate 34' and two glaze solutions are used, which contrast with one another either in shade, color, or in both shade and color.

Figure 13:
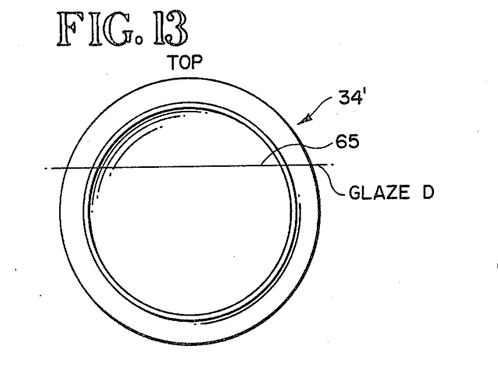
FIGS. 13 through 17 illustrate successive steps in applying the glaze in accordance with a second embodiment of the present invention FIGS. 13, and 15-18 being plan views of the front surface of the plate, and FIG. 14 being an isometric view showing the front surface of the plate.
Figure 14:
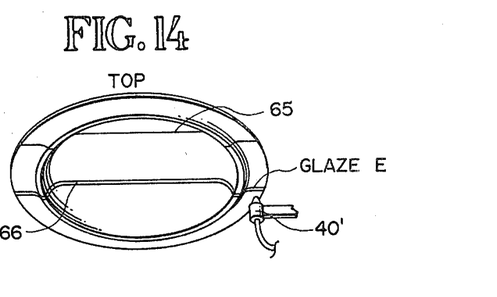

As shown in FIG. 13, the plate 34' is positioned with its top side located upwardly, and is dipped into a first glaze solution, glaze D, up to a first glaze line 65 positioned above the middle portion of the plate 34'. To glaze D solution is permitted to dry for about five minutes, and then a thin band or stripe of a glaze E solution (which contrasts with glaze D) is spayed at 66 onto the plate. This stripe 66 is spayed on the lower portion of the plate, moderately below the middle horizontal axis 24'. This glaze stripe can be applied as in the first embodiment, for example by means of a spray gun 40, and a template (not shown for ease of illustration) if desired.

Figure 15:
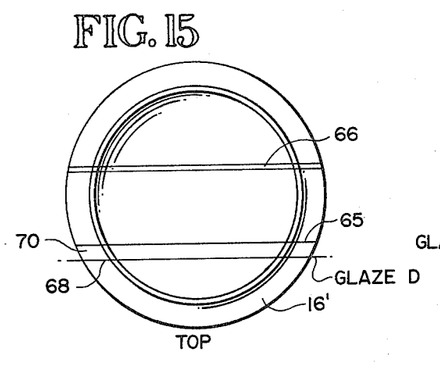

With reference to FIG. 15, the next step is to invert the plate 34' so that the top side is positioned downwardly, and to then dip the plate into the glaze D solution to a glaze line 68 positioned closer to the top of the plate 34' than the first glaze line 65. The band or zone 70 which is positoned between the two glaze lines 65 and 68 becomes in the end configuration of the plate 10' the second zone 62a.

Figure 16:
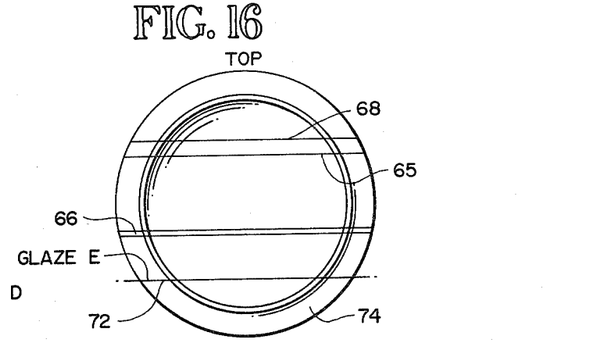

Next, as shown in FIG. 16, the plate 34' is inverted so that the top side is up, and the plate 34' is then dipped into the glaze E solution up to a glaze line 72, which is positioned moderately below the thin stripe or band 66. The portion 74 of the plate 34' which is below the glaze line 72 becomes in the end configuration the lowermost stripe 60d, while that portion of the plate between the glaze line 72 and the stripe 66 becomes the fourth band 64b.

Figures 17, 18:
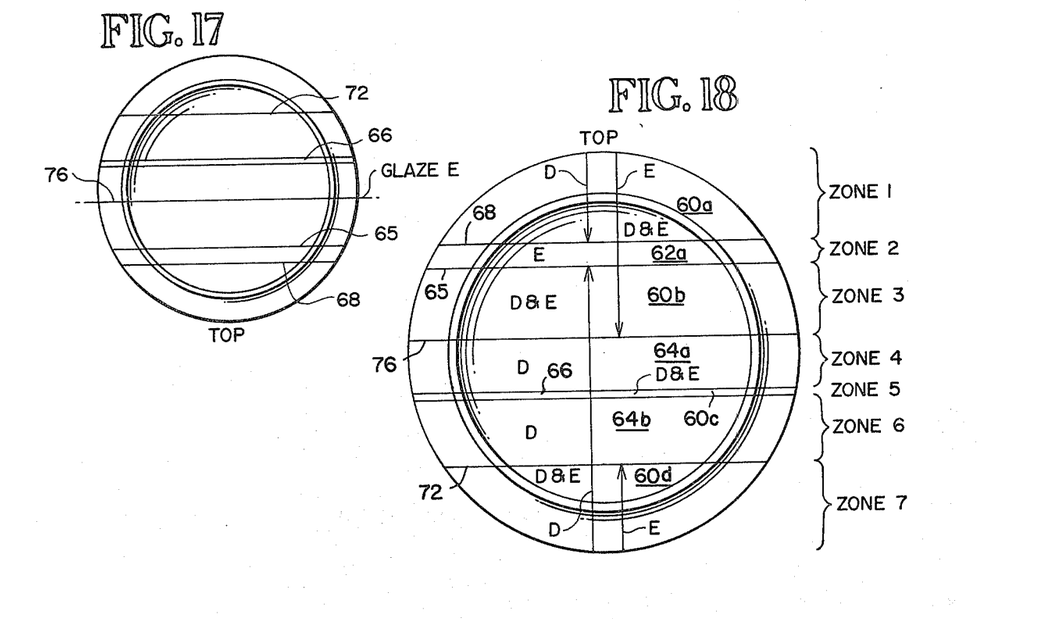
FIG. 18 is a plan view illustrating the make-up of the contrasting stripes of the finished product which is the plate made by the process of the second embodiment of the present invention.

The final dipping step is accomplished as illustrated in FIG. 17, where the plate 34' is inverted so that the top side is down, and the plate 34' is dipped into the glaze E solution to the depth of a glaze line 76 which is located between the first glaze line 65 and the thin stripe 66. The area between the glaze lines 76 and 65 becomes in the end configuration the third stripe or zone 60b. The area between the fourth glaze line 76 and the stripe 66 becomes the fourth stripe or zone 64a.

As in the first embodiment, with regard to the timing of these various steps, the plate 36' is permitted to dry for a short period of time (e.g. five minutes) before a second glaze solution is applied to the plate 34' in a manner to overlap an earlier applied glaze solution. Subsequent to the dipping steps illustrated in FIGS. 13 through 17, the plate 34' is subjected to a firing process as described with reference to the first embodiment, with the result being the finished plate 10' of the second embodiment of the present invention.

In FIG. 18, the plate 10' is shown in plan view. To appreciate the overlapping pattern of the various glaze solutions, arrows have been drawn on the plate 10' to illustrate the direction and depth of each dip, with the glaze solution of that dip being identified. Thus, it can be seen that the first, third, fifth and seventh stripes, 60a, 60b, 60c and 60d, respectively, are of a shade and color which results from a combination of the glaze D and E solutions. The second stripe 62a is of a color and shade corresponding to the glaze E solution alone. The fourth and sixth stripes 64a and 64b, respectively, correspond in shade and color to the glaze D solution alone.

While the present invention has been described herein in the specific terms of applying a glazed solution to a dinner plate, it is to be understood that within the broader aspects of the present invention, the term "dinnerware" is to be interpreted more broadly than a plate or the like on which food is placed. Also, the term "glazed" and "glaze solution" is meant to be interpreted to include reasonable alternatives which may be outside the narrow technical definition of such terms. Also, within the broader aspects of the present invention, it is to be recognized that the sequence of the steps may be varied, that the pattern may be made more complex by adding additional steps, and that the pattern may be moderately simplified by omitting one or possibly more of the steps noted above, without departing from the overlapping stripes configuration of the present invention.

What is claimed is:

1. A method for making a decorative dinnerware article by applying a pattern on the dinnerware piece, said piece having an upper edge and a lower edge, said method comprising:
   a. applying a first glaze material to said piece in a manner that said first glaze material reaches between said upper edge to a first glaze line positioned between said lower and upper edges to create a first glaze area;
   b. applying a second glaze material to said piece in a manner that said second glaze material extends between said lower edge to a second glaze line positioned below said first glaze line to create a second glaze area and a third intermediate area between said first and second glaze areas;
   c. applying a third glaze material to extend over said first glaze area, over said third intermediate area, and over at least a portion of said second glaze area to a third glaze line positioned below said first and second glaze lines, said third glaze material being contrasting relative to said first and second glaze materials, and said third glaze material being characterized in that a combination of the third glaze material being applied over said first or second glaze materials produces a combined glaze material differing in appearance from any one of said first, second or third glaze materials separately;
   d. subjecting said piece to a finishing process to cause said first, second and third glaze materials to become bonded to said dinnerware piece;
   whereby said piece becomes formed with a pattern of at least four sections, namely a first upper section corresponding to a combination of the first and third glaze materials, a second section corresponding to said third glaze material, a third section corresponding to a combination of said third and second glaze materials, and a fourth lower section corresponding to said second glaze material.

2. The method as recited in claim 1, wherein said first and second glaze materials are substantially similar to one another so that said first and third sections are of similar character.

3. The method as recited in claim 1, wherein said glaze lines are substantially parallel to one another, so that said sections are formed as substantially parallel stripes.

4. The method as recited in claim 3, further comprising applying a thin stripe or glaze material across said piece, and applying said first, second and third glaze materials in a manner that said first, second and third glaze lines are substantially parallel to said thin stripe.

5. A method for making a decorative dinnerware article by applying a pattern on a dinneware piece, said piece having an upper edge and a lower edge, said method comprising:
   (a) applying a first glaze material to said piece in a manner that said first glaze material reaches from said lower edge to a first glaze line positioned between said lower and upper edges to create a first glaze area,
   (b) applying a second glaze material to said piece in a manner that said second glaze material extends from said upper edge to a second glaze line positioned above said first glaze line to create a second glaze area and a third intermediate area between said first and second glaze areas,
   (c) applying a third glaze material to extend over said first glaze area and over a lower part of said intermediate area up to a third glaze line positioned between said first and second glaze lines, with an upper part of said intermediate area being positioned between said second and third glaze lines,
   (d) applying a fourth glaze material over said second glaze area, over the upper part of the intermediate area, and over an upper portion of the lower part of the intermediate area to a fourth glaze line positioned between said first and third glaze lines,
   (e) said third glaze material being characterized in that a combination of said third glaze material over said first glaze material produces a first combined glaze material differing from either one of said first and third glaze materials separately, and said fourth glaze material being characterized in that a combination of said fourth glaze material over either said second or third glaze materials produces a combined glaze material differing from either one of said second, third or fourth materials separately,
   (f) subjecting said piece to a finishing process to cause said first, second, third and fourth glaze materials to become bonded to said dinnerware piece,
   whereby said piece becomes formed with a pattern of at least five sections, namely a first upper section corresponding to a combination of said second and fourth glaze materials, a second section corresponding to said fourth glaze material, a third section corresponding to a combination of said third and fourth glaze materials, a fourth section corresponding to said third glaze material, and a fifth section corresponding to a combination of said first and third glaze materials.

6. The method as recited in claim 5, wherein said first and fourth glaze materials are contrasting with one another, whereby said first and fifth sections are of a contrasting character.

7. The method as recited in claim 6, wherein said second and third glaze materials are similar to one another, whereby said first and third sections are of a similar character.

8. The method as recited in claims 5, 6 or 7, further comprising applying a thin stripe of glaze material to said piece to form a contrasting stripe across one of said sections.

9. A method for making a decorative dinnerware article by applying a pattern on a dinnerware piece, said piece having an upper edge and a lower edge, said method comprising:
(a) applying a first glaze material to said piece in a manner that said first glaze material reaches from said lower edge to a first glaze line positioned between said lower and upper edges to create a first glaze area,
(b) applying a second glaze material to said piece in a manner that said second glaze material extends from said upper edge to a second glaze line positioned above said first glaze line to create a second glaze area and a third intermediate area between said first and second glaze areas,
(c) applying a third glaze material to extend over a lower part of said first glaze area to a third glaze line positioned below said first glaze line,
(d) applying a fourth glaze material over said second glaze area over said intermediate area and over an upper part of said first glaze area to a fourth glaze line positioned between said first and third glaze lines,
(e) said third glaze material being characterized in that a combination of said third glaze material over said first glaze material produces a combined glaze material differing from either one of said first and third glaze materials separately, and said fourth glaze material being characterized in that a combination of said fourth glaze material over either said first glaze material or said second glaze material produces a combined glaze material differing from any one of said first, second, or fourth glaze materials separately
(f) subjecting said piece to a finishing process to cause said first, second, third and fourth glaze materials to become bonded to said dinnerware piece, whereby said piece becomes formed with a pattern of at least five sections, namely a first upper section corresponding to a combination of said fourth and second glaze materials, a second section corresponding to said fourth glaze material, a third section corresponding to a combination of said fourth and first glaze material, a fourth section corresponding to said first glaze material, and a fifth section corresponding to said third and first glaze materials.

10. The method as recited in claim 9, wherein said first and second glaze materials are similar to one another, whereby said first and third sections are of a similar character.

11. The method as recited in claim 10, wherein said third and fourth glaze materials are similar to one another, whereby said first, third and fifth sections are of a similar character.

12. The method as recited in claims 9, 10 or 11, further comprising applying a thin stripe of glaze material to form a contrasting stripe across said piece.

* * * * *

UNITED STATES PATENT AND TRADEMARK OFFICE
CERTIFICATE OF CORRECTION

PATENT NO. : 4,468,419
DATED : August 28, 1984
INVENTOR(S) : James W. McBride

It is certified that error appears in the above-indentified patent and that said Letters Patent is hereby corrected as shown below:

Column 5, line 53, after "The" should read --second--.
        line 54, after "made" should read --where there--.
Column 6, line 19, after "." omit --To--.

Signed and Sealed this

Twenty-sixth Day of October, 1993

Attest:

BRUCE LEHMAN

*Attesting Officer*    *Commissioner of Patents and Trademarks*